(12) United States Patent
Wang

(10) Patent No.: US 7,017,520 B2
(45) Date of Patent: Mar. 28, 2006

(54) PET SEPARATION DEVICE IN VEHICLES

(76) Inventor: Chiu-Kuei Wang, No. 42, 4 Lin, Shin-Fuh Lee, Yuan-Li Town, Miao-Lih Hsien (TW)

( * ) Notice: Subject to any disclaimer, the term of this patent is extended or adjusted under 35 U.S.C. 154(b) by 0 days.

(21) Appl. No.: 10/703,475

(22) Filed: Nov. 10, 2003

(65) Prior Publication Data

US 2005/0115518 A1     Jun. 2, 2005

(51) Int. Cl.
*B60P 3/04*     (2006.01)
(52) U.S. Cl. ..................................... 119/412; 296/24.43
(58) Field of Classification Search ............... 119/412, 119/414, 473, 771; 296/24.4, 24.42, 24.43, 296/24.46; 224/559
See application file for complete search history.

(56) References Cited

U.S. PATENT DOCUMENTS

| | | | | |
|---|---|---|---|---|
| 2,302,300 A | * | 11/1942 | Davies | 224/559 |
| 2,997,331 A | * | 8/1961 | Kudner | 296/24.46 |
| 3,044,800 A | * | 7/1962 | Wicker | 280/748 |
| 3,190,686 A | * | 6/1965 | Smiler | 296/24.46 |
| 3,190,687 A | * | 6/1965 | Johnson | 296/24.46 |
| D326,076 S | * | 5/1992 | Wiese | D12/414 |
| 5,551,726 A | * | 9/1996 | Ament | 280/749 |
| D393,622 S | * | 4/1998 | Goertzen | D12/426 |
| D473,838 S | * | 4/2003 | Wang | D12/414 |
| 6,799,534 B1 | * | 10/2004 | Wang | 119/412 |

OTHER PUBLICATIONS

Kennel-Aire Inc., www.kennel-aire.com/Pages/aibarrieaire.*

* cited by examiner

*Primary Examiner*—Michael J. Carone
*Assistant Examiner*—Susan C. Alimenti
(74) *Attorney, Agent, or Firm*—Rosenberg, Klein & Lee

(57) ABSTRACT

A pet separation device includes two tubes each have a top suction member connected a top end thereof and an inclined tube is retractably connected to a lower end of each of the tubes. A bottom suction member is connected to each of the two inclined tubes. A first netted separation member is fixed to the two tubes and two second separation members each have a part overlapped to the first separation member. A plurality of locking assemblies connect the overlapped first separation member and the second separation members.

4 Claims, 6 Drawing Sheets

PET SEPARATION DEVICE IN VEHICLES

FIELD OF THE INVENTION

The present invention relates to a pet separation device used in vehicles and the pet separation device has a solid structure and does not shake by pets.

BACKGROUND OF THE INVENTION

A conventional pet separating device used in vehicles is shown in FIG. 6 and generally includes two posts 40 each have a top sucking member 43 and a bottom sucking member 44 for respectively contacting against the ceiling and the floor of the vehicle. Each post 10 includes a rod 42 and two sleeves 41 are mounted to the rod 12. Each sleeve 41 includes two extensions 411 extending radially outward and a groove 412 is defined in each extension 411 so that two transverse tubes 51 are engaged with the grooves 112. Two U-shaped parts 52 are inserted into the two open ends of the two transverse tubes 51 so as to form rounded ends.

It is experienced that the pets frequently hit the U-shaped parts 22 and the transverse tubes 51 so that the U-shaped parts 52 tend to be shaken in the transverse tubes 51 and the transverse tube 51 are loosened in the grooves 112, so that the conventional pet separating device generates a lot of noise.

SUMMARY OF THE INVENTION

The present invention relates to a pet separation device which comprises two tubes and a first separation member is fixedly connected to the two tubes. Each tube has a top suction member connected a top end thereof and an inclined tube is retractably connected to a lower end of each of the tubes. A bottom suction member is connected to each of the two inclined tubes. Two second separation members each have a part thereof overlapped to the first separation member and a plurality of locking assemblies are used to connect the overlapped first separation member and the second separation members.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
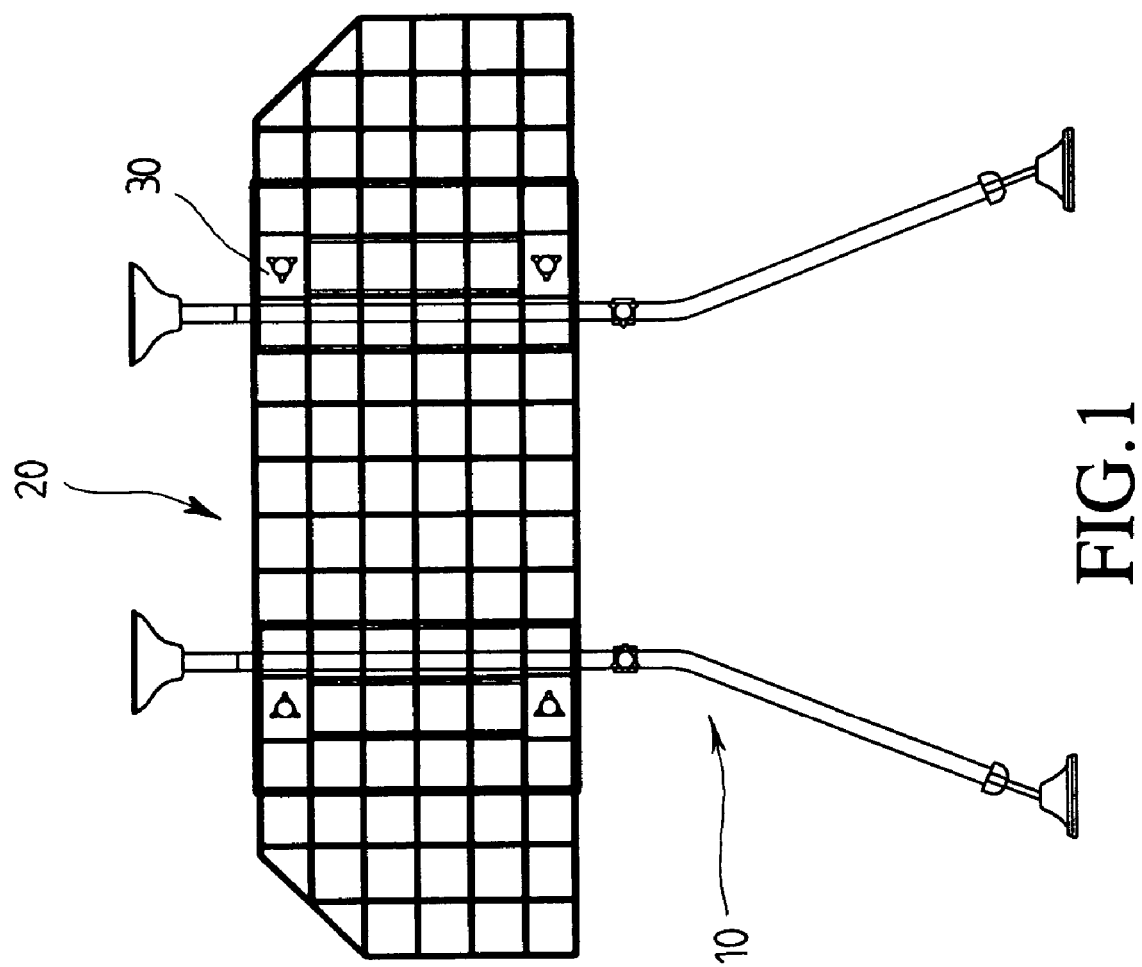
FIG. 1 is a front view of the pet separation device of the present invention.
Figure 2:
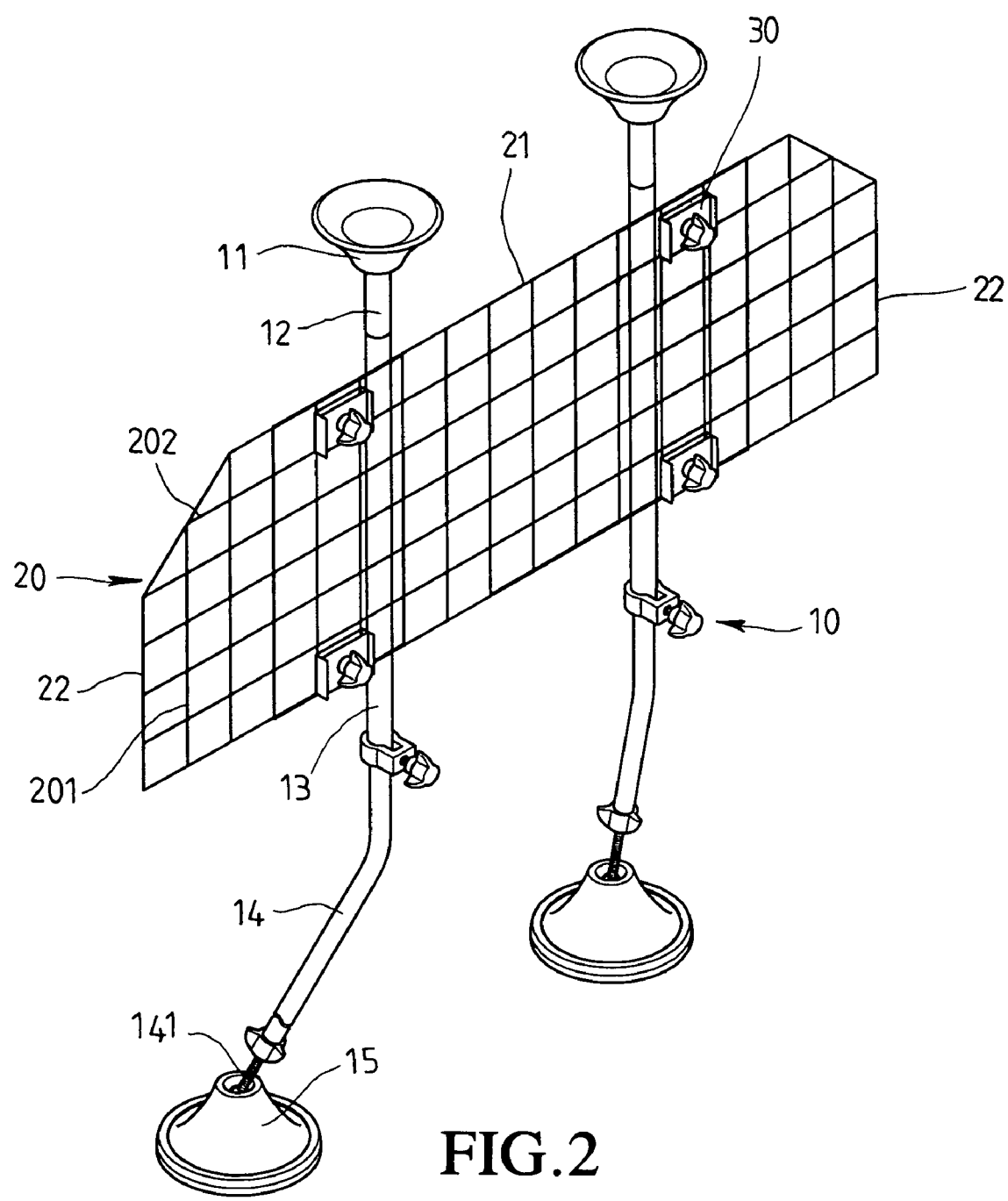
FIG. 2 is a perspective view to show the pet separation device of the present invention.
Figure 3:
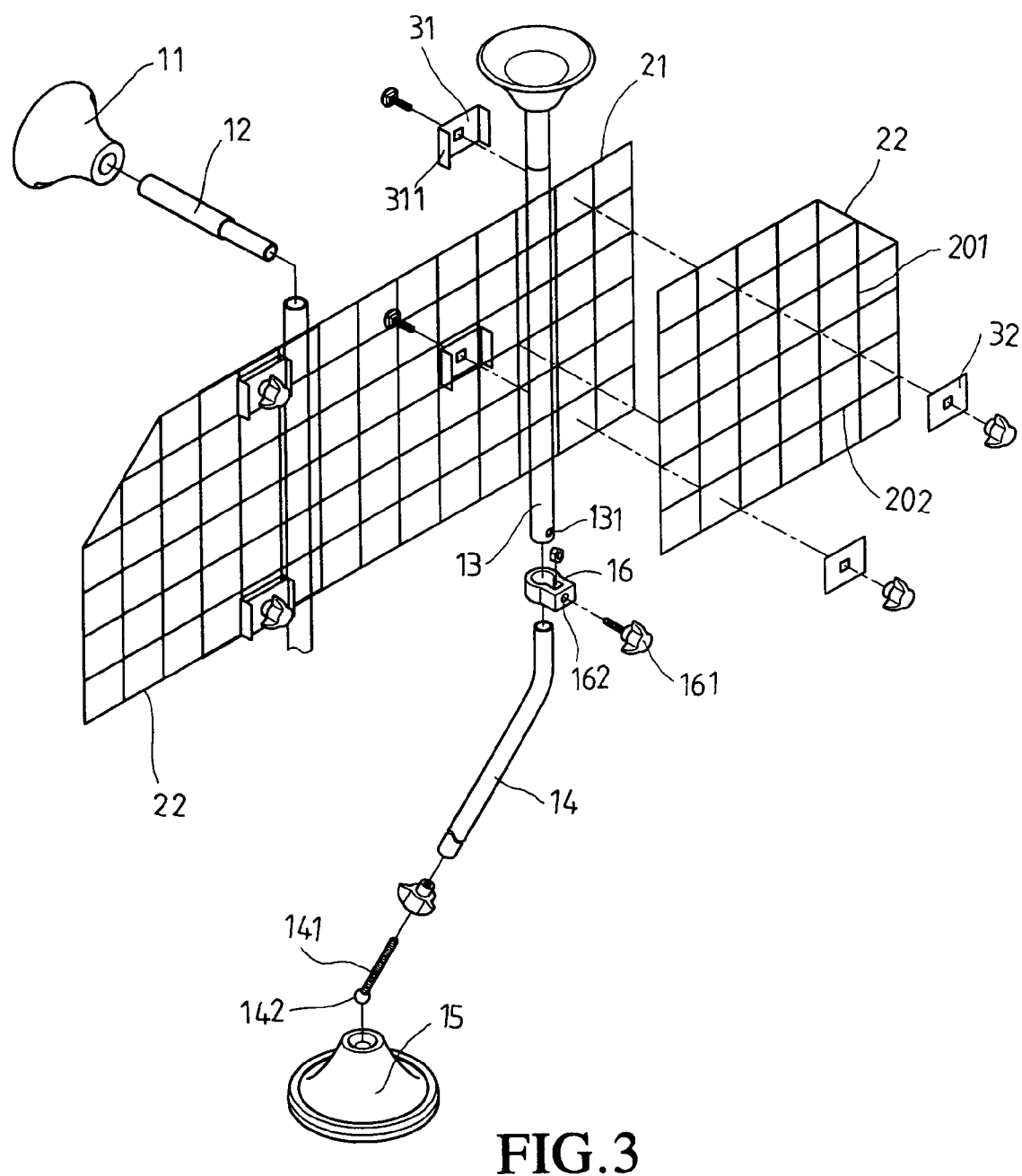
FIG. 3 is an exploded view to show the pet separation device of the present invention.

Referring to FIGS. 1 to 3, the pet separation device of the present invention comprises two posts 10 and a separation web 20 connected to the two posts 10. Each post 10 includes a tube 13 which has an extension tube 12 connected to a top end thereof and a top suction member 11 is connected to the extension tube 12. An inclined tube 14 is retractably connected to a lower end of each of the tubes 13 and each inclined tube 14 has an adjusting bolt 141 connected to the lower end thereof. Each adjusting bolt 141 has a sphere 142. A bottom suction member 15 is connected to each of the adjusting bolt 141 and each bottom suction member 15 has a recess defined in a top thereof and the sphere 142 of each adjusting bolt 141 is rotatably engaged with the recess in the bottom suction member 15. This allows the bottom suction member 15 always properly put on the floor of a vehicle. A collar 16 is mounted to the lower end of each of the tubes 13 and a bolt 161 extends through a hole 162 in the collar 16 and a hole 131 defined through each of the tubes 13, the bolt 161 then contacts the inclined tube 14 inserted in the lower end of the tube 13. Accordingly, the inclined tubes 14 can be adjustably connected to the tubes 13 by operating the bolts 161.

The separation web 20 includes a first separation member 21 fixedly connected to the tube 13, and two second separation members 22 each have a part thereof overlapped to the first separation member 21. A plurality of locking assemblies 30 connect the overlapped first separation member 21 and the second separation members 22. It is to be noted that the first separation member 21 and the second separation members 22 each are composed of a plurality of longitude bars 201 and latitude bars 202 which are welded to the longitude bars 201. Each locking assembly 30 includes a U-shaped plate 31 and a stop plate 32. Each U-shaped plate 31 has two side plates 311 extending perpendicularly from two ends of the U-shaped plate 3 and the two side plates 311 of each U-shaped plate 31 are engaged to two longitude bars 201. A bolt extending through the U-shaped plate 31, the overlapped first separation member 21 and second separation member 22, and the stop plate 32 and is connected to a nut.

Figure 4:
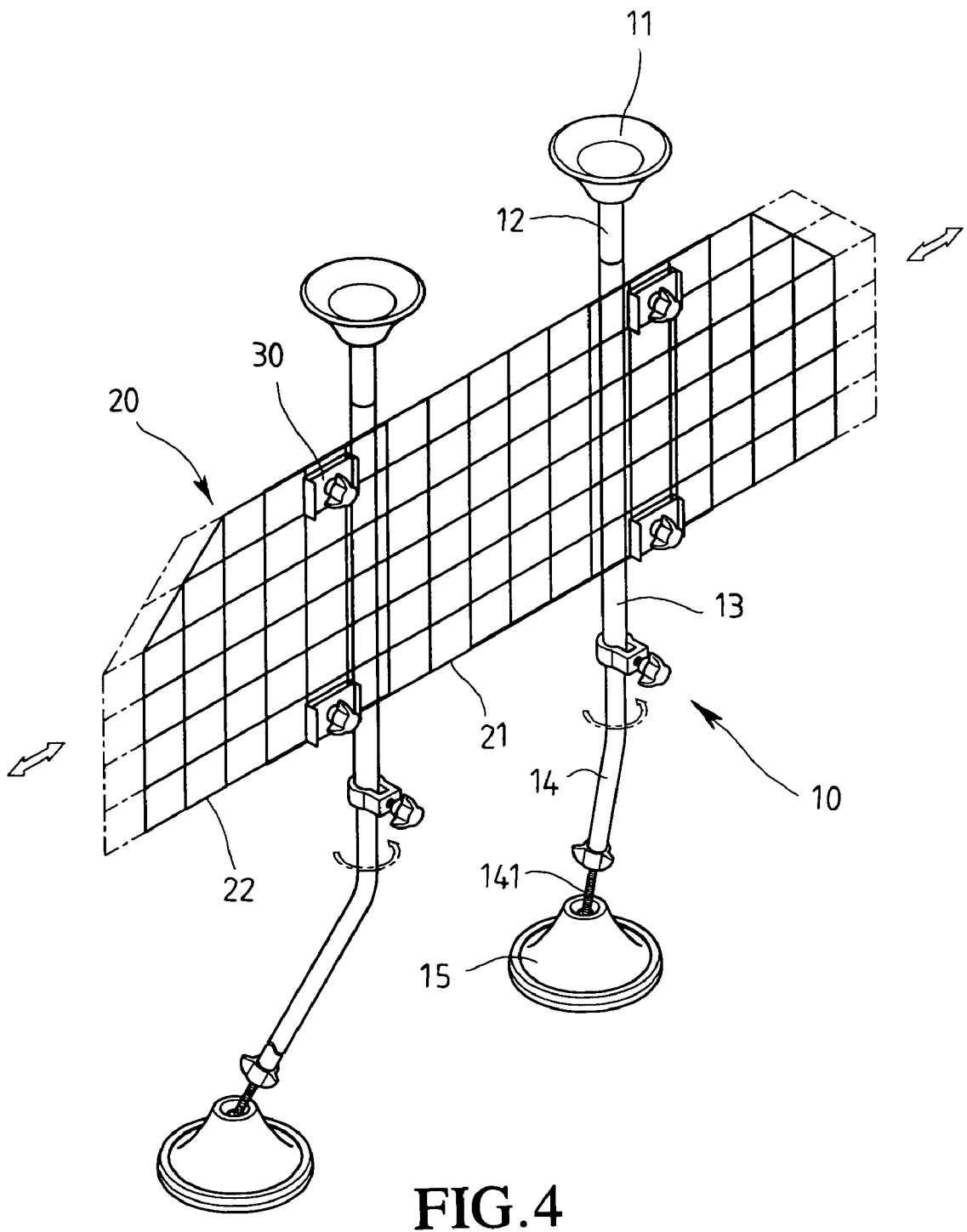
FIG. 4 shows the two second separation members are adjustably connected to the first separation member.
Figure 5:
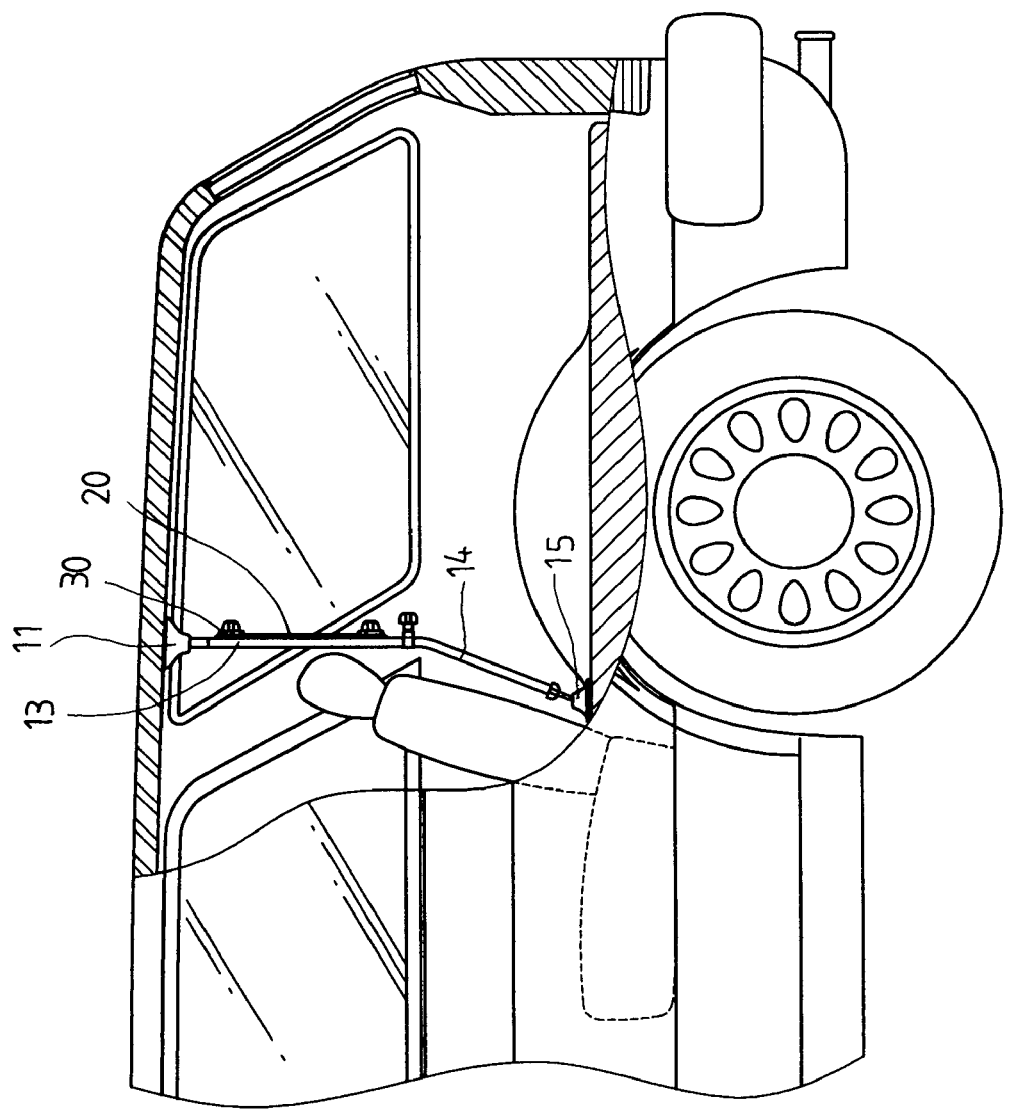
FIG. 5 shows the pet separation device of the present invention is installed in a vehicle.
Figure 6:
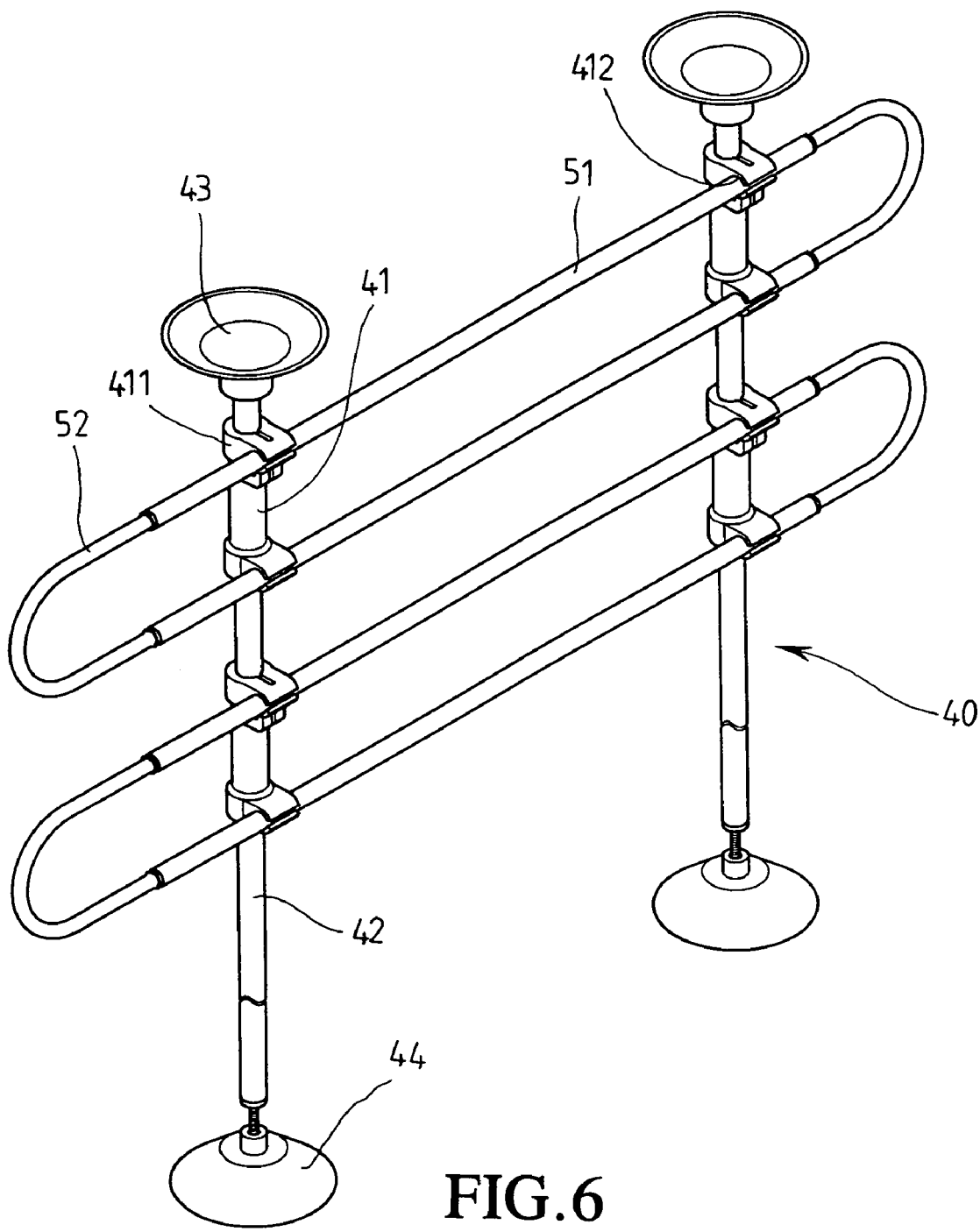
FIG. 6 shows a conventional pet separation device.

Referring to FIG. 4, the size of the separation web 20 can be adjusted by adjusting the second separation members 22. Due to the solid structure of the first separation member 21 and the second separation member 22, there will be less noise generated by the impact from the pet. Each inclined tube 14 can be rotated relative to the tube 13 so as to adjust the positions of the bottom suction members 15.

While we have shown and described the embodiment in accordance with the present invention, it should be clear to those skilled in the art that further embodiments may be made without departing from the scope of the present invention.

What is claimed is:

1. A pet separation device comprising:

two tubes each having a top suction member connected to a top end thereof and an inclined tube retractably connected to a lower end of each of the tubes, each inclined tube having a bottom suction member connected thereto, each bottom suction member having a recess defined in a top thereof and each inclined tube having an adjusting bolt connected to the lower end thereof, each adjusting bolt having a sphere which is rotatably engaged with the recess in the bottom suction member;

a first separation member fixedly connected to the two tubes, the first separation member being formed by a plurality of laterally spaced longitudinally directed first bars and a plurality of longitudinally spaced laterally directed second bars welded to the first bars;

two second separation members each having a portion thereof respectively disposed in overlapping relationship with corresponding portions of the first separation member, each of the second separation members being formed by a plurality of laterally spaced longitudinally directed third bars and a plurality of longitudinally spaced laterally directed fourth bars welded to the third bars; and a plurality of locking assemblies connecting the overlapping portions of each of the second separation members with the first separation member, each of the locking assemblies clampingly engaging corresponding second bars and overlaying fourth bars.

2. The device as claimed in claim 1, wherein a collar is mounted to the lower end of each of the tubes and a bolt extends through the collar and a hole defined through each of the tubes and contacts the inclined tube inserted in the lower end of the tube.

3. The device as claimed in claim 1, wherein each locking assembly includes a U-shaped plate having two side plates extending perpendicularly from two ends of the U-shaped plate, a stop plate disposed between the two side plates, and a bolt extending through the U-shaped plate, the overlapped first separation member and a respective second separation member, and the stop plate.

4. The device as claimed in claim 3, wherein the two side plates of each U-shaped plate are respectively engaged to the send and fourth bars.

* * * * *